Aug. 4, 1959  R. B. LYNN  2,898,518
ELECTRICAL APPARATUS AND METHOD OF MANUFACTURING THE SAME
Filed Oct. 17, 1955  2 Sheets-Sheet 1
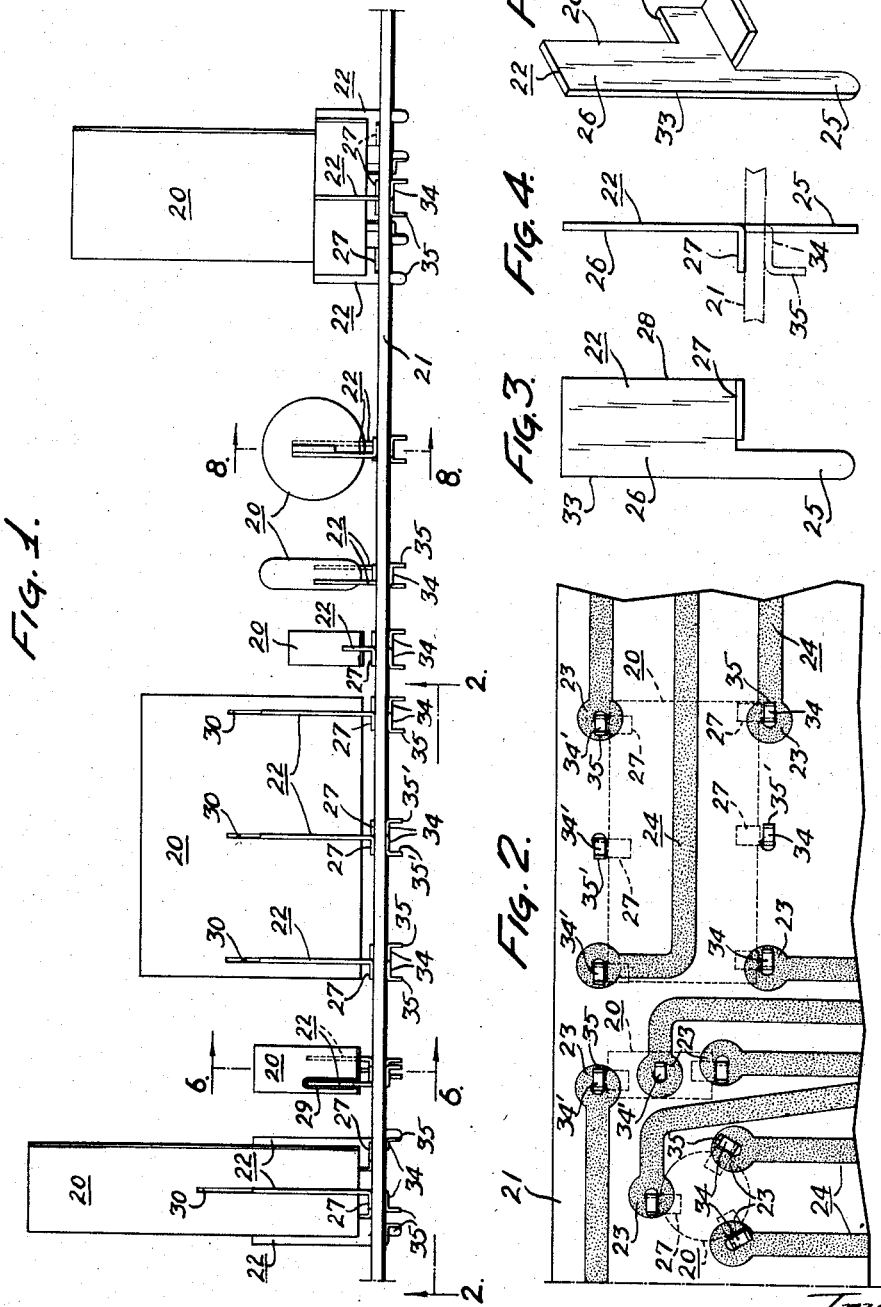
Inventor:
Raoul B. Lynn
by Howson & Howson
Attys.

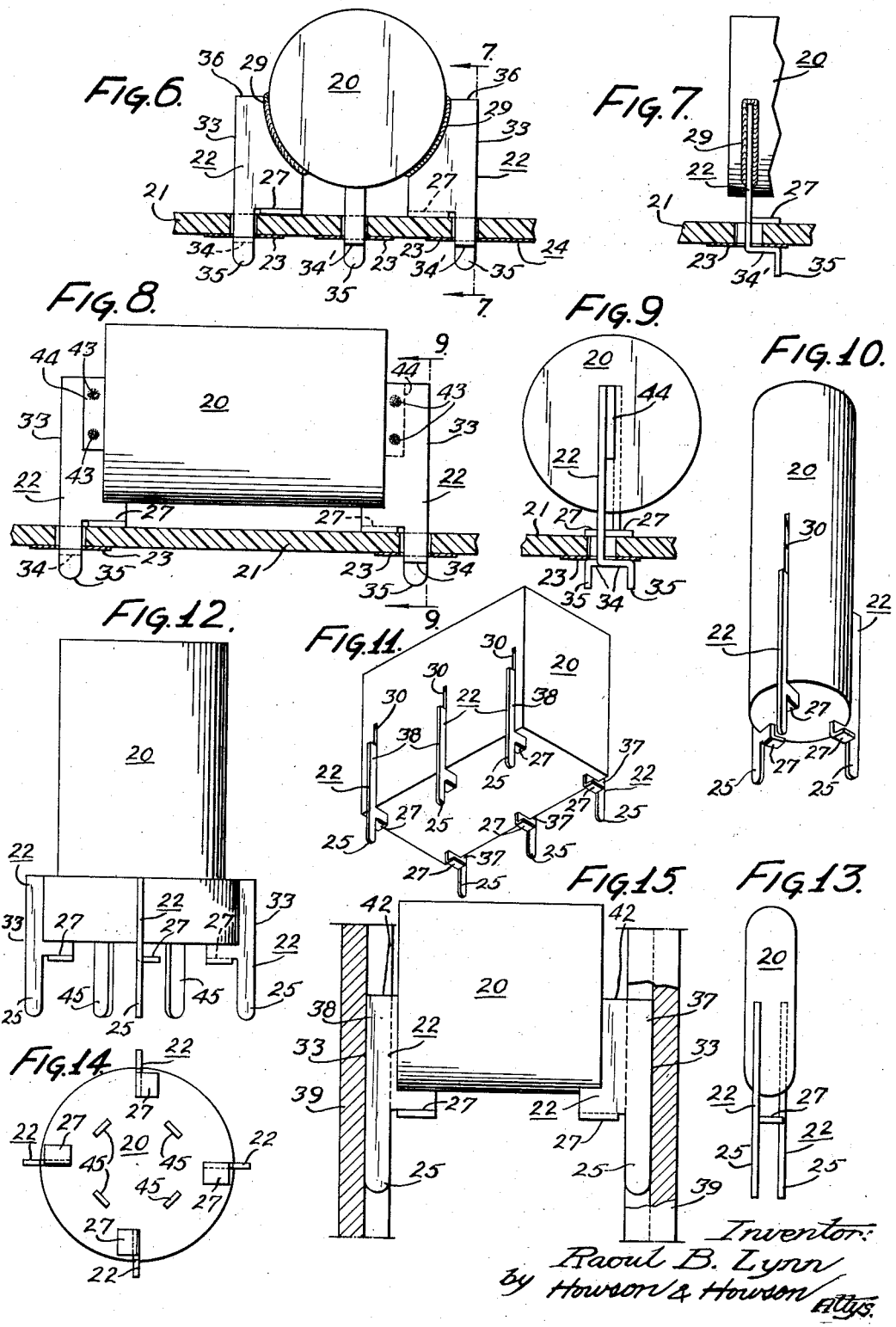

United States Patent Office 2,898,518
Patented Aug. 4, 1959

2,898,518
ELECTRICAL APPARATUS AND METHOD OF MANUFACTURING THE SAME

Raoul B. Lynn, Willow Grove, Pa., assignor to Philco Corporation, Philadelphia, Pa., a corporation of Pennsylvania Application October 17, 1955, Serial No. 540,902

3 Claims. (Cl. 317—101)

This invention relates to electrical apparatus, and to parts assembled together to constitute such apparatus, and to improved process features performed in the manufacture thereof. While it has considerable flexibility in certain of its aspects and the uses to which it may be applied, it was conceived and developed as an improvement in the art of wiring panels and in the securement of components mechanically and electrically in desired association with the panel proper.

The wiring panels employed in the practice of the invention may be of the so-called "printed" or other types, and the final securement of the components to the panel may be attained by various means as for example by the familiar process in which a large number of components are secured in position and electrically interconnected with the circuit terminals simultaneously, by dipping the panel into a bath of molten solder.

An object of the invention has been to provide an electrical apparatus, in the form of a wiring panel with the desired electrical components supported and electrically interconnected therewith, in which both the mechanical and electrical connections of the components to the panel are outstandingly rigid and secure.

A further object of the invention has been to obtain the desired electrical interconnection of the panel to the components through the same lugs employed for the mechanical securement of the parts together, while improving the strength and rigidity of the interconnection.

A further object has been to provide a combination of parts for mechanical and electrical interconnection which lends itself admirably to high speed automatic manufacturing procedures.

A further object has been to provide a combination of parts in which the means employed to obtain the desired intersecurement serves at the same time as a guide in directing the parts to the desired associated relationship, as a stop for accurately locating and holding them, and as a shoulder or abutment to receive and transmit the desired insertion and holding pressure.

A further object has been to provide a relatively simple and inexpensive lug which may be used effectively in these desired assembly and securing operations, and in the finished product.

A further object has been to provide a method for use in assembling and securing operations as discussed above, in which the parts may be more rapidly assembled and more rigidly and firmly secured than has heretofore been possible, and in which parts of the lugs later used to secure the components in place serve as guides and to insure proper orientation, and also provide a limit stop for accurate and firm relative positioning and holding.

A further object of the invention has been to provide a lug mounting, and a method of assembling together the components with the supporting member, by or in which the insertion and holding pressure are applied directly and solely to the lugs, thereby obviating the danger of damage to the delicate electrical components which might result from pressure applied directly to or through these components.

Still further objects and advantages of the invention, and the manner in which they have been attained, will be evident from reading of the following detailed description in the light of the attached drawing, in which, Figure 1 is a side elevation of a wiring panel with components secured thereto in practice of the features of the invention, Figure 2 is a detailed bottom plan view looking in the direction of the arrows 2—2 of Figure 1, Figure 3 is a front elevation of a mounting lug used in, and forming a feature of, the invention, Figure 4 is a side elevation of the lug of Figure 3, illustrating by broken lines the manner in which it is secured to a wiring panel, Figure 5 is a perspective view of a slightly different form of mounting lug, Figure 6 is a cross-section on the line 6—6 of Figure 1, with parts shown in elevation, Figure 7 is a detailed side elevation and section on the line 7—7 of Figure 6, Figure 8 is a view similar to Figure 6, taken on the line 8—8 of Figure 1, Figure 9 is an end elevation and section on the line 9—9 of Figure 8, Figures 10 and 11 are perspective views illustrating application of the mounting lugs of the invention to two other types of component, Figures 12 and 13 are side elevations illustrating still different components, Figure 14 is a bottom plan view of the lugs and component of Figure 12, and Figure 15 is a view, partly in side elevation and partly in section, illustrating a step in assembling the component of Figure 13 with its associated panel.

In the form of the invention illustrated in detail in Figures 1 to 9 of the drawing, components designated in general by the reference numeral 20 in Figure 1 are secured in the desired electrical and mechanically interconnected relationship to a printed wiring panel 21 by a number of lugs 22. These lugs are secured in supporting relation to the components on one side of the panel, and they are clamped and secured against the other side and against the circuit connections 23 of the printed wiring circuit 24 through legs 25 of the lugs.

As illustrated in Figures 3 and 4, each lug 22 may comprise a main body portion 26, a tab portion 27 bent angularly from this main body portion at its lower end, and a leg portion 25 which may be formed of the lower portion of the lug from which the tab has been formed. The lug may, for example, be a flat, sheet metal, member, and the tab 27 may be formed by striking metal inwardly from this member at substantially a right angle to the main body portion 26. The leg 25 in turn may be formed as the result of striking out the tab and removal of other adjacent portions of the metal blank by a punching operation performed as a simultaneous or sequential step. The inner edge 28 of the lug provides an area of securement for support of the component, which may be permanently attached to the lug by any suitable form of securement, as for example by soldering or by a suitable adhesive, as illustrated at 29 in Figures 1, 6 and 7.

In most instances, the lugs will be interconnected and secured in permanent relationship to their respective components electrically as well as mechanically, as by having their inner edges 28 electrically connected to a terminal or tap of the component, and these edges may in appropriate cases be received in spaced slots 30 in the component to provide the desired connections through the respective components and between the terminal and tap connections 23 of the wiring circuit 24, as illustrated.

As illustrated in Figure 5, some or all of the lugs 22 may be cut away at the inner margins of their main body portions to provide an inner edge 28' terminating at its lower end in a shoulder 32, to provide even more rigid support for the component.

After securement of the lugs to the component to provide the desired electrical connections and physical support, the component is assembled and secured to the mounting panel as illustrated in Figures 1, 2 and 4 of the drawing. The component with the attached lugs is applied to the panel with lower shoulders or edges comprising the tabs 27 lying against the face opposite the wiring circuit 24, and the legs 25 extending through holes in the panel. Insertion and holding pressure is applied to upper shoulders or edges, outwardly extending from the component and terminating at the upper ends of the outer edges 33 of the lugs, and they are held in place under this pressure, with the tabs 27 exerting resilient force downwardly against the upper face of the panel as illustrated in Figure 4, while the legs 25 are bent angularly inwardly at 34, into clinching relation to the portion of the panel lying between tab 27 and the bent end 34 of the leg. The extreme end 35 of the leg is preferably again bent away from the plane of the panel to provide a projection which is especially well adapted to receive a bonding agent, as for example solder, by which the desired mechanical and electrical connection is secured between the component and the wiring panel.

While the lugs will be interconnected electrically to the wiring panel and to the components in most cases, it should be understood that they are useful in their function in securing the parts together in the desired physically interconnected relationship, even where no electrical connection is desired. As illustrated in support of the transformer at 35' in Figures 1 and 2, for example, it may be desirable in some instances to provide lug connections for support and securement of components, in addition to those required to complete the wiring connections. It should also be noted that electrical connections between the panel and components may be established in any desired manner, in supplementation or substitution for the connections obtained through the lugs, while still relying on the lugs to provide the desired strong and rigid mechanical interconnection. The rigidity of this interconnection may be improved by bending the paired or alternating lugs for securement of a component in opposite directions in crimping them against the under side of the panel, as illustrated at 34 and 34' in Figure 2.

A number of detailed features and advantages of the invention will be evident from consideration of these details as illustrated in Figures 6 to 15 of the drawing. The component 20 of Figures 6 and 7 may be dual disc capacitor, and it will be seen that the lugs 22 serve not only to provide the desired mechanical and electrical connections, but also have wide lateral wings or fins 36 which may be guided into position through a guide or chute member to obtain automatic assembly of the component and attached lugs with the wiring and mounting panel. These projecting fins may be made to serve not only in this guiding function but also to insure insertion of the components in the correct position, where polarization requires such control. Thus as illustrated in connection with the component of Figure 15, the lugs on the left may be inserted or embedded more deeply in the component, to provide guide fins or wings 37 on one side which are wider than the corresponding fins 38 on the opposite side. In this connection it may be observed that the lugs may vary greatly, and may be much wider in appropriate instances, than herein illustrated. By providing a container or feed magazine (not shown) with slots complemental to these fins of different width, or at least different degrees of projection exteriorly of the component, it is possible to obtain absolute insurance against accidentally reversed polarity upon insertion. At the same time, the automatic machinery by which the components are assembled and secured with the panel, including the slotted guides 39 through which the components are fed into place against the panel, may be of symmetrical construction making it possible to feed various types of component, or differently oriented components, into position. In order to insure the desired orientation, it is only necessary to provide the desired special complemental relationship between the feed magazine or container and the components with attached lugs, for initial feed to the automatic machinery from a correctly oriented position.

Figure 15 also illustrates the features of the invention by which the components may be assembled and secured without danger of damage from these operations. The laterally extending wings or fins 37 and 38 provide surfaces of sufficient width, at the upper ends or shoulders 42, for access against these shoulders downwardly by an insertion and holding tool between the guides 39 and the outer edges of the component 20. It is therefore unnecessary to apply any pressure to or through the component, as the force is transmitted entirely through the lug wings 37 and 38 and against their laterally bent tabs 27, in assembling and securing the parts in position.

Figures 8 and 9 illustrate the securement of a component which may be a resistor, by lugs which may be secured, as by welding or riveting at 43, to opposite sides of separate terminal connections 44 extending outwardly from the component 20 at its opposite ends.

Figure 10 illustrates application of the invention to a component providing two terminal connections and an intermediate tap, in this case a tapped power resistor. Thus, all three of the lugs serve in the dual capacity of a mechanical support and electrical connection. As in the other mountings illustrated, they provide conductors of very low impedance.

Figures 12 and 14 illustrate use of the lugs 22 as mechanical supports for an electrolytic capacitor, the electrical contacts being established jointly through said lugs and a different set of terminal connections 45. The guiding, positioning and other functions are accomplished as in the other cases discussed above, but the electrical connections are differently obtained.

Figure 13 illustrates the securement of a capacitor by lugs mounted in staggered arrangement at opposite sides, and these lugs are also more deeply embedded in the component on one side than the other. As discussed above, this provides orientation control when used in conjunction with a complementally unsymmetrical supply magazine, in supplying the components to insertion guides 39 as illustrated in Figure 15 and discussed above.

From the foregoing discussion, it will be evident that the invention provides an electrical apparatus in the form of a wiring panel and attached components of unusually rugged construction, while at the same time providing a lug construction and process features which greatly facilitate high speed automatic manufacturing operations. The mounting of the components on edges 28, 27, with or without resilient tabs on the latter edges makes it possible to secure them at desired heights to avoid dirt and moisture traps, permit wiring underlying the components, and to maintain them separated from the face of the panel sufficiently to avoid heat damage, where this is a problem.

While the invention has been illustrated and described only in connection with a single illustrative embodiment including a few variants as to detail, I wish it to be understood that it may be modified and refined in a variety of ways, and that I do not therefore wish to be limited in interpretation except by the scope of the following claims.

I claim:

1. In an electrical apparatus, the combination comprising a wiring panel having circuit connections on one face thereof; at least one component disposed adjacent the opposite face of said panel; and at least two metal lugs for securing said component to said panel, said lugs being disposed on peripherally spaced portions of the component, each lug having a generally flat body portion upstanding from said opposite face of the panel and secured along at least one edge of the flat body portion to one of said portions of the component, said flat body portion having an upper shoulder extending outwardly from the component and a similarly extending lower shoulder, the latter shoulder in contact with said opposite face of said panel, and each lug having additionally a leg extending downwardly beyond said lower shoulder and projecting through a hole in said panel to said one face thereof and engaging said panel at said one face.

2. A combination as defined in claim 1 in which said lower shoulder of each lug spaces the component from the panel.

3. A combination as defined in claim 1 in which the body portion of each lug is provided with a tab, attached to said lower shoulder and extending therefrom at an angle to the body portion, for contact with the panel.

References Cited in the file of this patent

UNITED STATES PATENTS

| | | |
|---|---|---|
| 2,196,147 | Dunn | Apr. 2, 1940 |
| 2,607,821 | Arsdell | Aug. 19, 1952 |
| 2,651,833 | Kernahan | Sept. 15, 1953 |
| 2,668,933 | Shapiro | Feb. 9, 1954 |
| 2,694,249 | Kapp | Nov. 16, 1954 |
| 2,703,853 | Chrystie | Mar. 8, 1955 |
| 2,777,193 | Albright | Jan. 15, 1957 |
| 2,790,961 | Camp | Apr. 30, 1957 |